United States Patent
Mølgaard et al.

(10) Patent No.: US 12,025,040 B2
(45) Date of Patent: Jul. 2, 2024

(54) EXHAUST GAS CLEANING SYSTEM AND METHOD FOR CLEANING EXHAUST GAS AND USE OF EXHAUST GAS CLEANING SYSTEM

(71) Applicant: ALFA LAVAL CORPORATE AB, Lund (SE)

(72) Inventors: Søren Mølgaard, Støvring (DK); Ruddi Kruse Mortensen, Nibe (DK); Nick Høy Hansen, Aalborg (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 17/641,610

(22) PCT Filed: Jul. 30, 2020

(86) PCT No.: PCT/EP2020/071495
§ 371 (c)(1),
(2) Date: Mar. 9, 2022

(87) PCT Pub. No.: WO2021/047819
PCT Pub. Date: Mar. 18, 2021

(65) Prior Publication Data
US 2022/0325646 A1    Oct. 13, 2022

(30) Foreign Application Priority Data
Sep. 10, 2019 (EP) .................................. 19196392

(51) Int. Cl.
*F01N 3/04* (2006.01)
*F01N 3/01* (2006.01)
*F01N 13/00* (2010.01)

(52) U.S. Cl.
CPC ................. *F01N 3/04* (2013.01); *F01N 3/01* (2013.01); *F01N 13/009* (2014.06); *F01N 2590/02* (2013.01)

(58) Field of Classification Search
CPC . F01N 3/04; F01N 3/01; F01N 13/009; F01N 2590/02; Y02T 10/12
See application file for complete search history.

(56) References Cited

U.S. PATENT DOCUMENTS

| | | | |
|---|---|---|---|
| 4,305,909 A | 12/1981 | Willett et al. | |
| 5,391,220 A | 2/1995 | Patterson | |

(Continued)

FOREIGN PATENT DOCUMENTS

| | | |
|---|---|---|
| CA | 2 936 603 A1 | 7/2015 |
| CN | 104289089 A | 1/2015 |

(Continued)

OTHER PUBLICATIONS

Cottrell, "WESP Wet Electrostatic Precipitator", Brochure, Hamon Research—Cottrell, Inc., Aug. 11, 1908, 4 pages.

(Continued)

*Primary Examiner* — Brandon D Lee
(74) *Attorney, Agent, or Firm* — BUCHANAN INGERSOLL & ROONEY PC (57) ABSTRACT

An exhaust gas cleaning system for cleaning exhaust gas onboard a ship includes an exhaust gas inlet for receiving exhaust gas, and a scrubber having a scrubbing section to clean exhaust gas from pollutants. The scrubbing section includes an exhaust gas inlet for receiving exhaust gas and an exhaust gas outlet for outputting exhaust gas. A wet Electrostatic Precipitator further cleans the exhaust gas after cleaning in the scrubbing section. The Precipitator includes an exhaust gas inlet communicating with the outlet of the scrubbing section for receiving the exhaust gas, an exhaust (Continued)

gas outlet for outputting the exhaust gas, and at least one channel to convey the exhaust gas from the inlet to the outlet of the Precipitator. Ejection devices are arranged between the scrubbing section and the channel, and each includes an ejection orifice facing the Electrostatic Precipitator and arranged to eject liquid towards the channel to clean it.

18 Claims, 5 Drawing Sheets

(56) References Cited

U.S. PATENT DOCUMENTS

| | | | |
|---|---|---|---|
| 5,557,923 | A | 9/1996 | Bolt et al. |
| 6,132,692 | A * | 10/2000 | Alix ........................ F23J 15/025 423/393 |
| 8,734,741 | B1 | 5/2014 | Suchak |
| 11,193,407 | B2 * | 12/2021 | Lee ..................... B01F 25/3131 |
| 2003/0108469 | A1 * | 6/2003 | Alix ........................ B01D 53/60 422/171 |
| 2004/0105802 | A1 * | 6/2004 | Duncan .................. B01D 53/73 423/235 |
| 2006/0261265 | A1 | 11/2006 | Ray et al. |
| 2009/0114092 | A1 * | 5/2009 | Bengtsson ................ B03C 3/53 96/44 |
| 2010/0266472 | A1 | 10/2010 | Peng |
| 2015/0023855 | A1 | 1/2015 | Laslo |
| 2015/0202567 | A1 | 7/2015 | Suchak |
| 2015/0292379 | A1 * | 10/2015 | Molgaard .......... B01D 53/1406 60/297 |
| 2016/0279563 | A1 | 9/2016 | Ginsberg et al. |
| 2021/0146297 | A1 * | 5/2021 | Lee ......................... F01N 3/208 |

FOREIGN PATENT DOCUMENTS

| | | |
|---|---|---|
| CN | 105339617 A | 2/2016 |
| CN | 207546187 U | 10/2017 |
| EP | 2 659 947 A1 | 11/2013 |
| EP | 2 719 440 A1 | 4/2014 |
| EP | 2955345 A1 | 12/2015 |
| EP | 3384974 A1 | 10/2018 |
| EP | 2998529 B1 | 2/2019 |
| JP | H04-371212 A | 12/1992 |
| JP | H07-155537 A | 6/1995 |
| JP | H11-253733 A | 9/1999 |
| JP | 2004-337776 A | 12/2004 |
| JP | 2009052440 A | 3/2009 |
| JP | 2011-523993 A | 8/2011 |
| SE | 1600290 A1 | 4/2018 |
| SE | 540530 C2 | 9/2018 |
| WO | 2010026018 A1 | 3/2010 |
| WO | 2014/114735 A1 | 7/2014 |
| WO | 2014/118819 A1 | 8/2014 |
| WO | WO-2016167708 A1 * | 10/2016 ........... B01D 47/021 |
| WO | 2018032081 A1 | 2/2018 |

OTHER PUBLICATIONS

International Search Report (PCT/ISA/210) and Written Opinion (PCT/ISA/237) dated Sep. 3, 2020, by the European Patent Office as the International Searching Authority for International Application No. PCT/EP2020/071495.

Office Action (The First Office Action) dated Mar. 24, 2023, by the State Intellectual Property Office of People's Republic of China in corresponding Chinese Patent Application No. 202080077180.7. (8 pages).

Office Action (Notice of Reasons for Rejection) dated Match 27, 2023, by the Japan Patent Office in corresponding Japanese Patent Application No. 2022-515742 and an English translation of the Office Action. (13 pages).

Search Report dated May 10, 2023, by the Intellectual Property Office of Singapore in corresponding Singapore Patent Application No. 11202202212U. (2 pages).

Written Opinion dated May 15, 2023, by the Intellectual Property Office of Singapore in corresponding Singapore Patent Application No. 11202202212U. (6 pages).

English translation of the Office Action (Notice of Reasons for Rejection) dated Aug. 21, 2023, by the Japan Patent Office in corresponding Japanese Patent Application No. 2022-515742. (6 pages).

English translation of the Office Action (Decision of Rejection) issued Jan. 18, 2024, by the Japan Patent Office in corresponding Japanese Patent Application No. 2022-515742. (12 pages).

English translation of the Office Action (Decision of Rejection) issued Apr. 12, 2024, by the Chinese Patent Office in corresponding Chinese Patent Application No. 2020-80077180.7 (16 pages).

Zhang Weiliang et al., China Environmental Science Publishing House, ISBN 7-80093-812-3X-958; Feb. 1995, First Edition (18 pages).

* cited by examiner

EXHAUST GAS CLEANING SYSTEM AND METHOD FOR CLEANING EXHAUST GAS AND USE OF EXHAUST GAS CLEANING SYSTEM

TECHNICAL FIELD

The invention relates to an exhaust gas cleaning system for cleaning exhaust gas onboard a ship, e.g. from a marine engine, burner or boiler. The invention also relates to a method for cleaning exhaust gas onboard a ship, e.g. from a marine engine, burner or boiler, by means of such an exhaust gas cleaning system. Further, the invention relates to a use of such an exhaust gas cleaning system on-board a ship for the purpose of reduction of pollutants in exhaust gas from a marine combustion engine, burner or boiler.

BACKGROUND ART

Large ships are typically driven by engines operating on sulphur containing fuel, more particularly high sulphur heavy fuel oil. In the combustion of such fuel, exhaust gas containing sulphur oxides ($SO_X$) is formed. The exhaust gas typically also contains particulate matter, such as soot, oil, heavy metals and black carbon (BC) primarily consisting of sub micron elemental carbon particulates. In order to reduce the impact of the exhaust gas on the environment, the exhaust gas should be cleaned from these pollutants before it is released into the atmosphere. For example, the exhaust gas could be passed through a scrubber to be washed with a scrubbing fluid whereby pollutants in the exhaust gas are caught in the scrubbing fluid.

The scrubber could be a so-called open loop scrubber, which uses the natural alkalinity of seawater to wash out the sulphur oxides from the exhaust gas. Seawater is then fed from the sea, through the scrubber for absorption of $SO_X$ and particulate matter from the exhaust gas, before it is discharged back to the sea.

Alternatively, the scrubber could be a so-called closed loop scrubber, which uses circulating freshwater or seawater, typically in combination with an alkaline agent like sodium hydroxide (NaOH) or sodium carbonate ($Na_2CO_3$), to wash out sulphur oxides and particulate matter from the exhaust gas. In such a scrubber, the amounts of aqueous sulphite, sulphate salts and particulate matter in the circulating freshwater or seawater are gradually increasing. Thus, to control the quality of the circulating freshwater or seawater, a small amount of it may occasionally or continuously be replaced by clean freshwater or seawater and either be stored on the ship or be discharged overboard after cleaning from particulate matter.

The scrubbers used for this purpose today are capable of removing most of the sulphur oxides and some, but less, of the particulate matter from the exhaust gas. $SO_X$ emissions are already regulated by the IMO worldwide and regulation of black carbon is expected in the future. In view thereof, there is a need for an exhaust gas cleaning technique enabling removal of more particulate matter from marine exhaust gas.

SE 540 530 discloses an equipment for cleaning of exhaust gas by feeding it through a scrubber followed by a wet Electrostatic Precipitator for collecting particulate matter still in the exhaust gas after it has passed the scrubber. The cleaned exhaust gas is then passed through a demister before leaving the equipment. Nozzles for flushing, with fresh water, particulate matter from the wet Electrostatic Precipitator are arranged between the wet Electrostatic Precipitator and the demister. The demister is provided to minimize release of droplets generated by the nozzles and polluted by the exhaust gas into the atmosphere.

SUMMARY

An object of the present invention is to provide an improved exhaust gas cleaning system for cleaning exhaust gas onboard a ship, an improved method for cleaning exhaust gas by means of such a system and an improved use of such an exhaust gas cleaning system on-board a ship.

The basic concept of the invention is to provide cleaning of exhaust gas by means of a scrubber combined with a wet Electrostatic Precipitator, also referred to as wESP, with a positioning of means for cleaning the wet Electrostatic Precipitator that minimize the release of polluted droplets into the atmosphere. The exhaust gas cleaning system, method and use according to the invention are defined in the appended claims and discussed below.

An exhaust gas cleaning system according to the present invention is arranged for cleaning exhaust gas onboard a ship. It comprises an exhaust gas inlet for receiving the exhaust gas to be cleaned and a scrubber arranged to clean, in a scrubbing section of the scrubber, the exhaust gas from pollutants. The scrubbing section comprises an exhaust gas inlet for receiving the exhaust gas before cleaning and an exhaust gas outlet for outputting the exhaust gas after cleaning. The exhaust gas cleaning system further comprises a wet Electrostatic Precipitator arranged to further clean the exhaust gas from pollutants after it has been cleaned in the scrubbing section. Accordingly, the wet Electrostatic Precipitator comprises an exhaust gas inlet arranged in communication with the exhaust gas outlet of the scrubbing section for receiving the exhaust gas before said further cleaning and an exhaust gas outlet for outputting the exhaust gas after said further cleaning. Further, the wet Electrostatic Precipitator comprises at least one channel arranged to convey the exhaust gas from the exhaust gas inlet to the exhaust gas outlet of the wet Electrostatic Precipitator. Also, the exhaust gas cleaning system comprises an exhaust gas outlet for outputting the cleaned exhaust gas. The exhaust gas cleaning system is characterized in that it further comprises a second number≥1 of first ejection devices, such as nozzles or sprayers, arranged between the scrubbing section and said at least one channel. Each of the first ejection devices comprises an ejection orifice, aperture or opening facing the wet Electrostatic Precipitator and being arranged to, when exhaust gas is flowing through the exhaust gas cleaning system, intermittently or continuously, eject liquid towards said at least one channel to clean it from pollutants deposited by the exhaust gas when this is conveyed through said at least one channel.

Said liquid ejected by the first ejection devices may be an alkaline fluid, i.e. have a pH value above 7 to provide for optimal removal of SOx from the exhaust gas. For example, said liquid may be sea water, a mixture of fresh water and an alkaline agent or a mixture of sea water and an alkaline agent, or any combination thereof. The exhaust gas cleaning system could be arranged for cleaning exhaust gas from a marine engine onboard a ship, a marine burner onboard a ship or a marine boiler onboard s ship.

The scrubber may be a wet scrubber arranged to wash the exhaust gas with a scrubbing fluid in the form of a scrubbing liquid.

The scrubber of the exhaust gas cleaning system may be of open loop type and the scrubbing fluid may be seawater. Then, seawater may be taken from the sea and passed through the scrubber once before being discharged back to the sea, directly or after cleaning.

Alternatively, the scrubber of the exhaust gas cleaning system may be of closed loop type and the scrubbing fluid may be either seawater or fresh water mixed with an alkaline agent such as Mg(OH)2, MgO, Na2CO3, CaCO3, NaOH, or Ca(OH)2 or a combination thereof. For such a closed loop scrubber, a scrubbing fluid inlet of the scrubber may be arranged in communication with a scrubbing fluid outlet of the scrubber to enable recirculation of the scrubbing fluid through the scrubber. An exhaust gas cleaning system comprising a scrubber of closed loop type may further comprise a circulation tank. The circulation tank may be in communication with the scrubber, e.g. with the scrubbing fluid outlet thereof, for receiving the scrubbing fluid from the scrubber after exhaust gas cleaning. Further, the circulation tank may be in communication with the scrubber, e.g. with the scrubbing fluid inlet thereof, for feeding the scrubbing fluid to the scrubber. Some of the scrubbing fluid may, intermittently or continuously, be bled off from the closed loop to be cleaned before being discharged or fed back to the closed loop.

Scrubbing fluid, whether originating from a scrubber of open loop type or a scrubber of closed loop type, may, for example, be cleaned by means of one or more separators and/or filters.

Said at least one channel is defined by at least one wall at least partly enclosing the channel. By the first ejection devices ejecting liquid towards said at least one channel, pollutants are removed from said at least one wall. Said at least one channel could, as an example, be formed by at least one plate extending inside the wet Electrostatic Precipitator. For example, several channels could be formed by a plurality of plates arranged in parallel inside the wet Electrostatic Precipitator. As another example, said at least one channel could be formed by a tube extending inside the wet Electrostatic Precipitator, which tube could be designed with any suitable cross section, such as a circular, oval or polygonal, for example hexagonal, cross section. For example, several channels could be formed by a bundle of parallel tubes arranged inside the wet Electrostatic Precipitator.

It should be stressed that "communicating" and "communication", throughout the text, means "communicating directly or indirectly" and "direct or indirect communication", respectively. Similarly, "receiving", "feeding", "outputting" etc., throughout the text, means "receiving directly or indirectly", "feeding directly or indirectly", and "outputting directly or indirectly", respectively.

The pollutants may comprise sulphur oxides and particulate matter, such as soot, oil, heavy metals and black carbon. In the scrubbing section, the exhaust gas will be cooled and cleaned from most of the sulphur oxides and some, but less, of the particulate matter. In the wet Electrostatic Precipitator, the exhaust gas will be further cleaned from the particulate matter and remaining sulphur oxides.

Throughout the text, when an ejection device is said to be arranged to eject liquid towards something, it is directed, i.e. it has an ejection direction, towards this something.

When liquid is ejected by the first ejection devices, liquid droplets are formed which absorb particulate matter and sulphur oxides from the exhaust gas and get polluted. Since the first ejection devices are arranged before or upstream the wet Electrostatic Precipitator with respect to a flow direction of the exhaust gas through the exhaust gas cleaning system, the droplets will enter, and be collected by, the wet Electrostatic Precipitator. Therefore, very few polluted droplets will pass the wet Electrostatic Precipitator. Accordingly, the wet Electrostatic Precipitator performs a "demister function" in that it prevents droplets from escaping the exhaust gas cleaning system. On the contrary, in an equipment according to SE 540 530, the nozzles for flushing the wet Electrostatic Precipitator are arranged after or downstream the wet Electrostatic Precipitator with respect to a flow direction of the exhaust gas through the equipment. Accordingly, relatively light ones of the droplets generated by the nozzles and polluted by the exhaust gas will not reach, and be caught by, the wet Electrostatic Precipitator.

Due to the positioning of the nozzles in SE 540 530, a demister downstream the wet Electrostatic Precipitator is essential for catching the relatively light droplets, which otherwise may leave the equipment together with the exhaust gas. According to one embodiment of the present invention, the exhaust gas cleaning system lacks a demister between the exhaust gas outlet of the wet Electrostatic Precipitator and the exhaust gas outlet of the exhaust gas cleaning system. Then, the exhaust gas outlet of the wet Electrostatic Precipitator may be in direct communication with the exhaust gas outlet of the exhaust gas cleaning system. Without a demister, the exhaust gas cleaning system according to the invention can be made more compact and space effective, which is especially advantageous where space is scarce, such as on-board a ship.

The exhaust gas cleaning system may be so constructed that the scrubbing section and the wet Electrostatic Precipitator are arranged in succession inside the scrubber. According to such an embodiment, a shell or housing enclosing and defining the scrubbing section may also enclose the wet Electrostatic Precipitator. Thereby, a particularly compact exhaust gas cleaning system is enabled which may allow reuse of scrubbing fluid and which may be easier and cheaper to build. In such a system, the outlet of the exhaust gas system as such may coincide with an exhaust gas outlet of the scrubber.

According to an alternative embodiment, the exhaust gas cleaning system is so constructed that the scrubber comprises an exhaust gas outlet for outputting the exhaust gas after said cleaning, which exhaust gas outlet is arranged in communication with the exhaust gas outlet of the scrubbing section for forwarding the exhaust gas after said cleaning. Further, the exhaust gas inlet of the wet Electrostatic Precipitator is arranged in communication with the exhaust gas outlet of the scrubber for receiving, before said further cleaning, the exhaust gas after said cleaning. This means that the wet Electrostatic Precipitator is arranged outside the scrubber. For example, the scrubber comprising the scrubbing unit and the wet Electrostatic Precipitator may be separately arranged and connected by suitable piping. This embodiment is advantageous in that it enables straight-forward retrofitting of an existing scrubber system into a system according to the present invention.

The exhaust gas cleaning system may be such that the scrubbing section comprises a first sub scrubbing section and a third number≥1 of second ejection devices, such as nozzles or sprayers, arranged inside the first sub scrubbing section. The second ejection devices may be arranged to eject a scrubbing fluid or liquid into the exhaust gas to wash the same. Such a first sub scrubbing section may form a so-called jet section or a sprayer section in a wet scrubber.

Further, the exhaust gas cleaning system may be such that the scrubbing section comprises a second sub scrubbing section and a fourth number≥1 of third ejection devices, such as nozzles or sprayers, and a filling or packed bed, random or structured, arranged inside the second sub scrubbing section. The third ejection devices may be arranged to supply scrubbing fluid or liquid to the filling to wash the exhaust gas when this passes through the filling. The second sub scrubbing section may be arranged between the wet Electrostatic Precipitator and the first sub scrubbing section. The third ejection devices may be arranged to form a fluid or liquid film on particles of the filling to increase the contact area between the exhaust gas and the fluid or liquid and, thereby, the pollutants absorption capacity of the second sub scrubbing section. Such a second sub scrubbing section may form a so-called filling or packed bed section in a wet scrubber.

The scrubbing fluid ejected in the first and second sub scrubbing sections of the scrubbing section may be the same type of scrubbing fluid or different types of scrubbing fluids.

The first sub scrubbing section may comprise a scrubber chamber inside which the exhaust gas is washed, the scrubber chamber having an essentially constant cross section along a major part of its longitudinal extension. This embodiment involves a "uniform" scrubber chamber which is straight-forward to produce, compact and associated with a low back pressure as compared to, for example, a scrubber chamber of venturi type or a U-shaped scrubber chamber with or without a venturi.

The second sub scrubbing section and a wESP section of the exhaust gas cleaning system comprising the wet Electrostatic Precipitator may have essentially similar outer contours along a longitudinal center axis of the second scrubbing section and the wESP section. This embodiment enables an exhaust gas system which is compact and straight-forward to produce.

The scrubbing fluid may be an alkaline fluid, i.e. have a pH value above 7 to provide for optimal removal of SOx from the exhaust gas. For example, the scrubbing fluid may be sea water, a mixture of fresh water and an alkaline agent or a mixture of sea water and an alkaline agent, or any combination thereof.

The exhaust gas cleaning system may further comprise a fifth number≥1 of fourth ejection devices, such as nozzles or sprayers, arranged between the exhaust gas outlet of the exhaust gas cleaning system and said at least one channel. These fourth ejection devices may be arranged to eject liquid towards said at least one channel, when no exhaust gas is flowing through the exhaust gas cleaning system, to clean said at least one channel from pollutants deposited by the exhaust gas when this is conveyed through said at least one channel. Accordingly, the fourth ejection devices may be operated, for example, for closedown cleaning or maintenance of the exhaust gas cleaning system.

The exhaust gas cleaning system may be so designed that an exhaust gas flow direction through the wet Electrostatic Precipitator and at least most of the scrubbing section is essentially vertical, and for example upwards. For example, the wet Electrostatic Precipitator may be arranged straight above or on top of said at least most of the scrubbing section. Such a vertical exhaust gas cleaning system may demand a relatively small footprint, which is beneficial onboard a ship where space is scarce. Further, a vertical exhaust gas cleaning system may enable oppositely directed flows, i.e. parallel counter flows, of exhaust gas and scrubbing fluid inside the exhaust gas cleaning system. Such parallel counter flows may enable longer time of contact between the exhaust gas and the scrubbing fluid, and thus a more efficient scrubbing, than cross flows, i.e. perpendicular flows, of exhaust gas and scrubbing fluid which are typically provided in a horizontal exhaust gas cleaning system.

A method according to the present invention is for cleaning exhaust gas onboard a ship by means of an exhaust gas cleaning system as defined above. It comprises the step of cleaning the exhaust gas from pollutants in a scrubbing section of a scrubber, and the step of further cleaning the exhaust gas from pollutants in a wet Electrostatic Precipitator after it has been cleaned in the scrubbing section. The wet Electrostatic Precipitator comprises at least one channel arranged to convey the exhaust gas through the wet Electrostatic Precipitator. The method is characterized in that it further comprises the step of ejecting, when exhaust gas is flowing through the exhaust gas cleaning system, liquid through a respective ejection orifice of a second number≥1 of first ejection devices arranged between the scrubbing section and said at least one channel, which ejection orifices face the wet Electrostatic Precipitator, towards said at least one channel to clean it from pollutants deposited by the exhaust gas when this is conveyed through said at least one channel.

The method may be such that said liquid ejected by the first ejection devices is an alkaline fluid.

The method could be arranged for cleaning exhaust gas from a marine engine onboard a ship, a marine burner onboard a ship or a marine boiler onboard a ship.

The method could be arranged for wet scrubbing, i.e. for washing the exhaust gas with a scrubbing fluid in the form of a scrubbing liquid. The scrubbing liquid could be passed only once, or be recirculated, through the scrubber.

The method may comprise the step of releasing the exhaust gas into the atmosphere, after said cleaning and further cleaning from pollutants, without passing it through a demister.

The scrubbing section and the wet Electrostatic Precipitator may be arranged in succession inside the scrubber such that said cleaning and said further cleaning of the exhaust gas from pollutants take place inside the scrubber.

Alternatively, the wet Electrostatic Precipitator may be arranged outside the scrubber such that said cleaning of the exhaust gas from pollutants takes place inside the scrubber, while said further cleaning of the exhaust gas from pollutants takes place outside the scrubber.

The method may comprise the step of ejecting a scrubbing fluid inside a first sub scrubbing section of the scrubbing section and into the exhaust gas to wash the same.

The method may further comprise the step of supplying scrubbing fluid to a filling arranged inside a second sub scrubbing section of the scrubbing section to wash the exhaust gas when this passes through the filling. The second sub scrubbing section may be arranged between the wet Electrostatic Precipitator and the first sub scrubbing section.

The method may further comprise the step of ejecting, when no exhaust gas is flowing through the exhaust gas cleaning system, liquid, through a fifth number≥1 of fourth ejection devices arranged between an exhaust gas outlet of the exhaust gas cleaning system and said at least one channel of the wet Electrostatic Precipitator, i.e. downstream the wet Electrostatic Precipitator, towards said at least one channel to clean them from pollutants deposited by the exhaust gas when this is conveyed through said at least one channel.

The method may be such that the scrubbing fluid has a pH value above 7.

The method may comprise feeding the exhaust gas through the wet Electrostatic Precipitator and at least most of the scrubbing section in an essentially vertical exhaust gas flow direction.

A use of an exhaust gas cleaning system as described above on-board a ship, according to the present invention, is for the purpose of reduction of pollutants in exhaust gas from a marine combustion engine, burner or boiler.

The above discussed advantages of the different embodiments of the exhaust gas cleaning system according to the invention are also present for the corresponding different embodiments of the method for cleaning exhaust gas and the use according to the present invention.

Still other objectives, features, aspects and advantages of the invention will appear from the following detailed description as well as from the drawings.

BRIEF DESCRIPTION OF THE DRAWINGS

The invention will now be described in more detail with reference to the appended schematic drawings, in which FIG. 1 schematically illustrates an exhaust gas cleaning system according to the invention and an engine, FIG. 2 schematically illustrates a cross section of the exhaust gas cleaning system in FIG. 1, FIG. 3 schematically illustrates another exhaust gas cleaning system according to the invention and an engine, FIG. 4 schematically illustrates a cross section of yet another exhaust gas cleaning system, and FIG. 5 schematically illustrates a cross section of yet another exhaust gas cleaning system.

DETAILED DESCRIPTION

Figure 1:
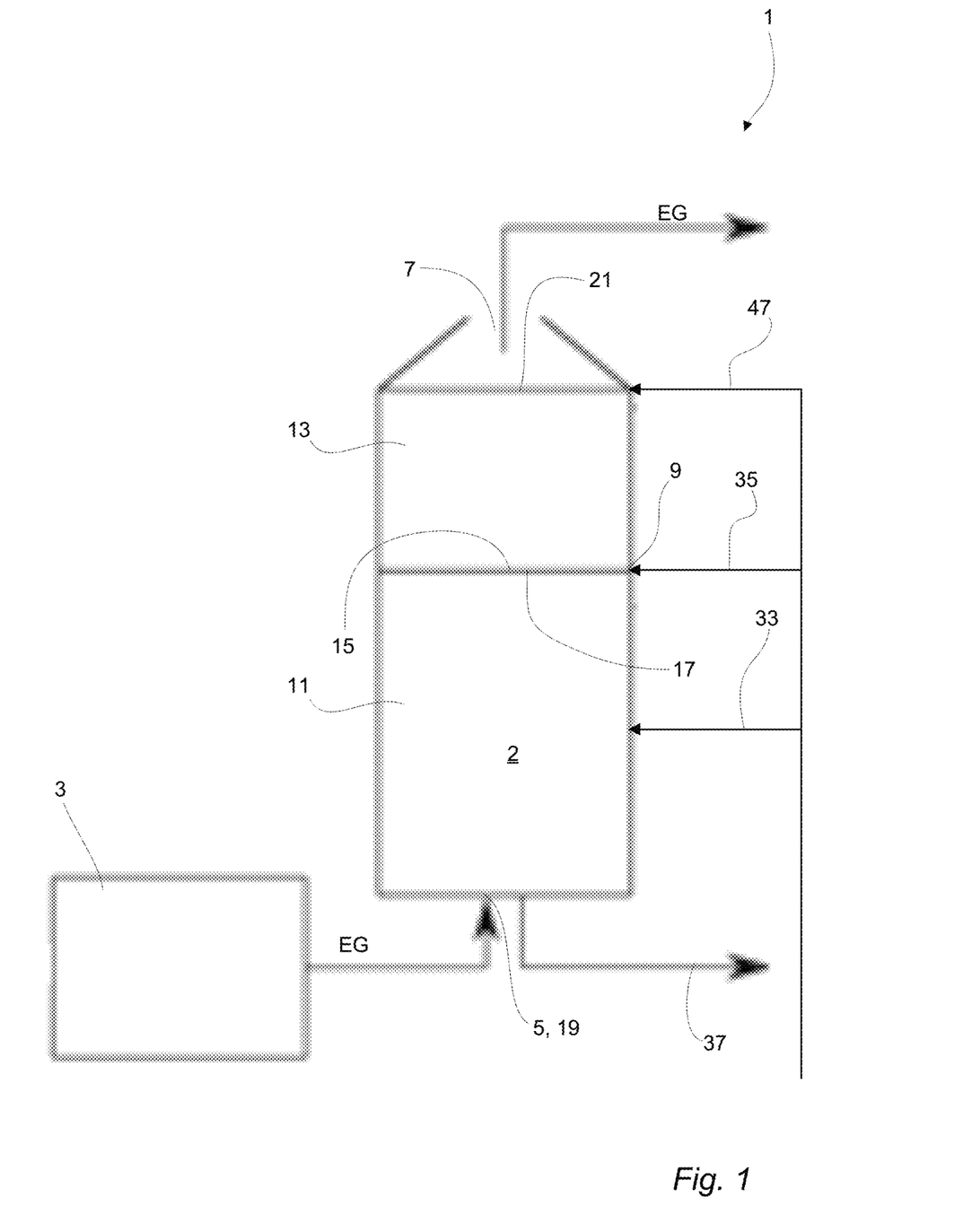

FIG. 1 illustrates an exhaust gas cleaning system 1 for cleaning exhaust gas (EG) from an engine 3 installed onboard a ship (not illustrated) from sulphur oxides and particulate matter, such as black carbon. The exhaust gas is fed from the engine 3 to the exhaust gas cleaning system 1 through an exhaust gas inlet 5 thereof, and through the exhaust gas cleaning system 1 in a vertical upward exhaust gas flow direction with a velocity of 0.1-6 m/s, preferably 1-4 m/s. The cleaned exhaust gas is fed from the exhaust gas cleaning system 1, through an exhaust gas outlet 7 thereof, into the atmosphere via a chimney not illustrated. The exhaust gas cleaning system, which is illustrated in more detail in FIG. 2, comprises a wet scrubber 9, in turn comprising a housing 2 defining a scrubber chamber 4 (FIG. 2) inside which the exhaust gas is cleaned. The scrubber chamber 4 has an essentially constant cross section along a major part of its longitudinal extension. The exhaust gas system comprises a scrubbing section 11 and a wESP (wet Electrostatic Precipitator) section 13. The scrubbing section 11 and the wESP section 13 are arranged aligned in succession inside the scrubber 9 with an exhaust gas outlet 15 of the scrubbing section 11 connected to an exhaust gas inlet 17 of the wESP section 13. An exhaust gas inlet 19 of the scrubbing section 11 is connected to, or actually coincides with, the exhaust gas inlet 5 of the exhaust gas cleaning system 1, while an exhaust gas outlet 21 of the wESP section 13 is connected to the exhaust gas outlet 7 of the exhaust gas cleaning system 1. Thus, the exhaust gas to be cleaned is fed first through the scrubbing section 11 for removal of most of the sulphur oxides and some of the particulate matter, and then through the wESP section 13 for removal of remnants of sulphur oxides and most of the remaining particulate matter.

Figure 2:
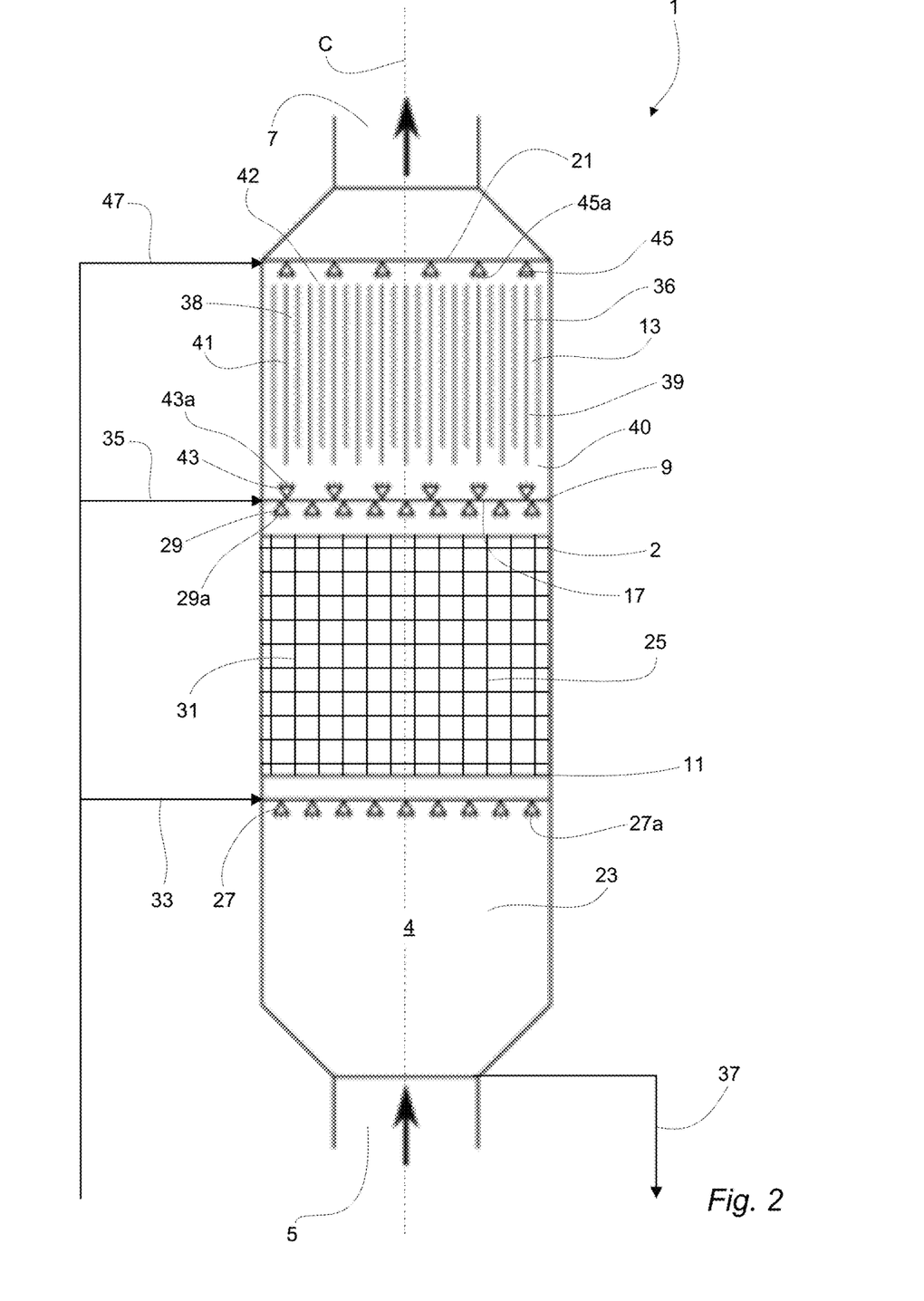

With reference to FIG. 2, the scrubbing section 11 comprises a first sub scrubbing section, more particularly a so-called jet section, 23, and a second sub scrubbing section, more particularly a so-called filling section, 25, the filling section 25 being arranged between the jet section 23 and the wESP section 13. The filling section 25 and the wESP section 13 have similar outer contours along a longitudinal vertical center axis C of the filling section 25 and the wESP section 13. The jet section 23 comprises a third number, for example about 2-10 per square meter of cross sectional area, of second ejection devices or nozzles 27 arranged along a bridge, of which nine are illustrated in FIG. 2. The nozzles 27 are arranged in a top portion of the jet section 23 and downwards directed, i.e. a respective ejection orifice 27a of the nozzles 27 faces downwards. When the exhaust gas cleaning system 1 is in operation and exhaust gas is fed through the scrubber 9, the nozzles 27 continuously spray scrubbing fluid, in the form of seawater, into the jet section 23 and thereby the exhaust gas when this passes through the jet section 23. Pollutants in the exhaust gas are absorbed in the scrubbing fluid such that the exhaust gas is cleaned when passing through the jet section 23. The filling section 25 comprises a fourth number, for example 14-60 depending on the size of the filling section, of third ejection devices or nozzles 29 arranged along a bridge, of which nine are illustrated in FIG. 2, and a filling 31 in the form of a gas and liquid permeable structure of stainless steel, plastic or any other suitable material. The nozzles 29 are arranged in a top portion of the filling section 25 and downwards directed, i.e. a respective ejection orifice 29a of the nozzles 29 faces downwards. When the exhaust gas cleaning system 1 is in operation and exhaust gas is fed through the scrubber 9, the nozzles 29 continuously spray scrubbing fluid, in the form of seawater, into the filling section 25 to form a liquid film on the surfaces of the filling structure. When the exhaust gas passes through the filling section 25 and the filling 31, pollutants in the exhaust gas are absorbed in the scrubbing fluid whereby the exhaust gas is further cleaned.

As indicated by the arrows 33 and 35 in FIG. 2, the scrubbing fluid, i.e. the seawater, is fed directly from the ships sea chest to the nozzles 27 and the nozzles 29. After having passed one or both of the sub scrubbing sections 23 and 25 once, depending on if fed from the nozzles 27 or the nozzles 29, the seawater is discharged from the scrubber 9, as indicated by the arrow 37, back to the sea, possibly after cleaning. Accordingly, the scrubber 9 is of open loop type.

The wESP section 13 comprises a wet Electrostatic Precipitator 39, which in turn comprises a bundle of a first number of tubes 41, for example about 10 tubes per square meter of cross sectional area, of which twelve are illustrated in FIG. 2. Each of the tubes 41, and more particularly a tube wall 36 thereof, defines a channel 38 with a hexagonal cross section arranged to convey the exhaust gas from an exhaust gas inlet 40 to an exhaust gas outlet 42 of the wet Electrostatic Precipitator 39. The exhaust gas inlet 40 and exhaust gas outlet 42 of the wet Electrostatic Precipitator 39 are connected to the exhaust gas inlet 17 and the exhaust gas outlet 21, respectively, of the wESP section 13. When the exhaust gas is conveyed through the tubes 41, pollutants still contained in the exhaust gas stick to the walls of the tubes 41 whereby the exhaust gas is further cleaned. The design and function of a wet Electrostatic Precipitator are well known and will not be described in detail herein.

Since pollutants from the exhaust gas are collected by the tubes 41 during exhaust gas cleaning, cleaning of the tubes 41 is necessary to avoid build-up of layers of pollutants on the walls of the tubes which could negatively affect the operation of the wet Electrostatic Precipitator 39. To this end, the wESP section 13 comprises a second number, for example about 2-13 per square meter of cross sectional area, of first ejection devices or nozzles 43, of which six are illustrated in FIG. 2. The nozzles 43 are arranged in a bottom portion of the wESP section 13, more particularly between the scrubbing section 11 and the tubes 41, and are upwards directed, i.e. a respective ejection orifice 43a of the nozzles 43 faces upwards and thus the wet Electrostatic Precipitator 39. When the exhaust gas cleaning system 1 is in operation and exhaust gas is fed through the scrubber 9 and the wet Electrostatic Precipitator 39, the nozzles 43 continuously spray cleaning fluid, in the form of seawater, towards the tubes 41 to clean them from pollutants.

The nozzles 29 and the nozzles 43 are arranged along one and the same bridge, but they could instead be arranged along two different bridges. Accordingly, the cleaning fluid, i.e. the seawater, is fed directly from the sea chest to the nozzles 43, as indicated by the arrow 35. The cleaning fluid is sprayed from the nozzles 43 upwards and into the tubes 41 to be collected on the walls of the tubes 41 before it flows downwards and brings with it the pollutants from the tube walls. The downwards flowing polluted cleaning fluid passes both the sub scrubbing sections 23 and 25 during absorption of further pollutants from the exhaust gas. Thus, the cleaning fluid also performs a scrubbing function when passing through the scrubbing section 11. Finally, the polluted cleaning fluid is discharged from the scrubber 9, as indicated by the arrow 37, together with the scrubbing fluid, back to the sea, possibly after cleaning.

During ejection of the cleaning fluid from the nozzles 43, cleaning fluid droplets are formed. To a small extent, these cleaning fluid droplets absorb pollutants from the exhaust gas. Thus, also in this aspect, the cleaning fluid also performs a scrubbing function inside the wESP section 13. The droplets are ejected into the tubes 41 and most of them are collected on the walls of the same to clean them in the above described way. More particularly, less than 5% of the droplets manage to pass the wet Electrostatic Precipitator. Since most of the droplets are collected of the tube walls, the wet Electrostatic Precipitator 39 performs a "demisting function" which removes the need for a separate demister after, or downstream, the wet Electrostatic Precipitator.

The exhaust gas cleaning system 1 further comprises a fifth number, for example about 2-13 per square meter of cross sectional area, of fourth ejection devices or nozzles 45 arranged along a bridge, of which six are illustrated in FIG. 2. The nozzles 45 are arranged in a top portion of the wESP section 13 and downwards directed, i.e. a respective ejection orifice 45a of the nozzles 45 faces downwards. When the exhaust gas cleaning system 1 is not in operation and no exhaust gas is fed through the scrubber 9, the nozzles 45 may spray cleaning fluid, in the form of seawater, to achieve a thorough cleaning of the wet Electrostatic Precipitator 39, especially the upper parts of the tubes thereof which are less exposed to the cleaning fluid ejected by the nozzles 43. More particularly, the nozzles 45 are arranged to spray cleaning fluid onto the walls of the tubes 41 to clean them from pollutants. The cleaning fluid, i.e. the seawater, is fed directly from the sea chest to the nozzles 45, as indicated by the arrow 47. After cleaning, the polluted cleaning fluid may be discharged, as indicated by the arrow 37, back to the sea, possibly after cleaning.

Thus, the exhaust gas cleaning system illustrated in FIGS. 1 and 2 can be used for performing a method for cleaning exhaust gas onboard a ship. The exhaust gas is cleaned from pollutants by passing it through a scrubber, and further cleaned from pollutants by passing it through the tubes of a wet Electrostatic Precipitator. In that the exhaust gas is fed in a vertical upwards flow direction through the exhaust gas cleaning system, and the scrubbing fluid and the cleaning fluid, inter alia due to gravity but also the direction of the downwards pointing nozzles, flow through the exhaust gas cleaning system in an opposite downwards direction, the exhaust gas is effectively cleaned inside the exhaust gas cleaning system. To ensure proper operation of the wet Electrostatic Precipitator, the tubes of it are cleaned during operation of the exhaust gas cleaning system by ejecting a cleaning fluid towards the tubes by means of nozzles arranged upstream the tubes. By the arrangement of the nozzles upstream the tubes, small, polluted droplets of cleaning fluid can be caught by the wet Electrostatic Precipitator such that no demister downstream the wet Electrostatic Precipitator is necessary to prevent that these small polluted droplets escape and are released into the atmosphere. By means of the inventive exhaust gas cleaning system, method and use, approximately 70-99% of the particulate matter, 70-99% of the black carbon and 70-99% of the sulphur oxides can be removed from the exhaust gas.

Figure 3:
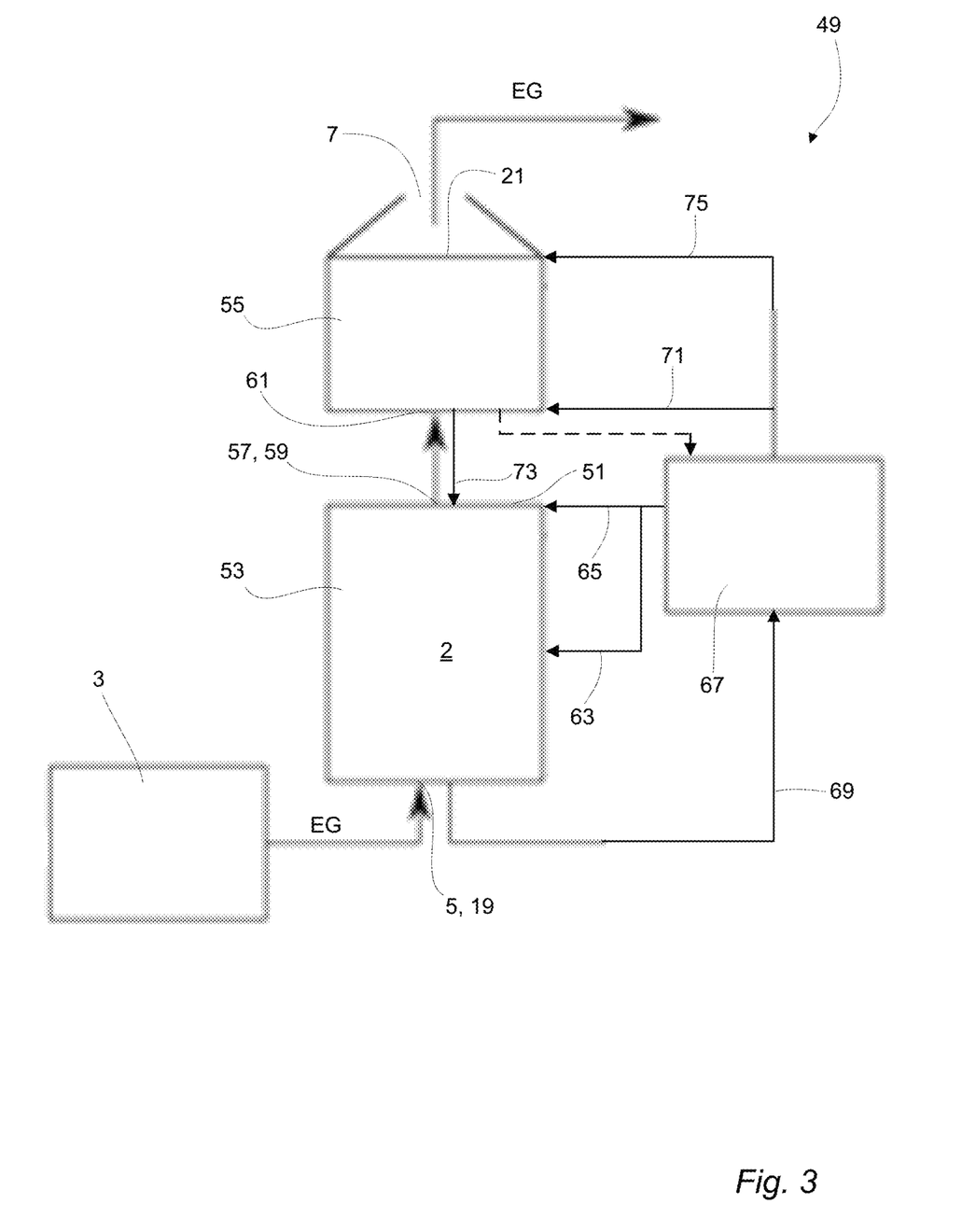

FIG. 3 illustrates a different embodiment of an exhaust gas cleaning system 49 according to the invention. The exhaust gas cleaning systems 1 (FIGS. 1 and 2) and 49 are very similar and differ only in a few points. Hereinafter, the differences between the exhaust gas cleaning systems 1 and 49 will be focused on.

The exhaust gas cleaning system 49 comprises a wet scrubber 51, a scrubbing section 53 and a wESP (wet Electrostatic Precipitator) section 55. The scrubbing section 53 is arranged inside the scrubber 51 while the wESP section 55 is arranged outside the scrubber 51. Accordingly, an exhaust gas outlet 57 of the scrubbing section 53 is connected to, or actually coincides with, an exhaust gas outlet 59 of the scrubber 51. Further, an exhaust gas inlet 61 of the wESP section 55 is connected to the exhaust gas outlet 59 of the scrubber 51 by means of suitable piping (schematically illustrated by an arrow extending from the scrubber 51 to the wESP section 55).

Just like the scrubbing section 11, the scrubbing section 53 comprises a jet section like the jet section 23 and a filling section like the filling section 25. The difference here is that the nozzles in the jet section and in the filling section spray scrubbing fluid in the form of a mixture of fresh water and sodium hydroxide instead of seawater. As indicated by the arrows 63 and 65 in FIG. 3, this mixture is fed from a circulation tank 67 to the nozzles in the jet and filling sections. After having passed one or both of the jet and filling sections, the mixture is fed back to the circulation tank 67, as indicated by the arrow 69. Accordingly, the scrubber 51 is of closed loop type. Continuously, or intermittently such as at regular intervals, some of the mixture may be bled off from the exhaust gas cleaning system 49 to be cleaned (not illustrated). The cleaned mixture may be discharged or fed back to the exhaust gas cleaning system 49.

Just like the wESP section 13, the wESP section 55 comprises nozzles in a bottom portion thereof. The difference here is that these nozzles spray cleaning fluid in the form of a mixture of fresh water and sodium hydroxide instead of seawater. Further, the nozzles in the bottom portion of the wESP section 55 are not arranged along the same bridge as the nozzles in the filling section since the wESP section 55 is arranged outside the scrubber 51. This mixture is fed from the circulation tank 67 to the nozzles in the bottom portion of the wESP section 55, as indicated by the arrow 71 in FIG. 3, and drained from wESP section 55 to the scrubbing section 53 through suitable piping illustrated by the arrow 73. In an alternative embodiment the mixture could instead be fed from the wESP section 55 to the circulation tank 67, as illustrated by the dashed arrow.

Just like the exhaust gas cleaning system 1, the exhaust gas cleaning system 49 comprises nozzles in a top portion of the wESP section 55. The difference here is that these nozzles spray cleaning fluid in the form of a mixture of fresh water and sodium hydroxide instead of seawater. This mixture is fed from the circulation tank 67 to the nozzles in the wESP section 55, as indicated by the arrow 75, and drained from wESP section 55 to the scrubbing section 53 through suitable piping illustrated by the arrow 73. Again, in an alternative embodiment the mixture could instead be fed from the wESP section 55 to the circulation tank 67, as illustrated by the dashed arrow.

Figure 4:
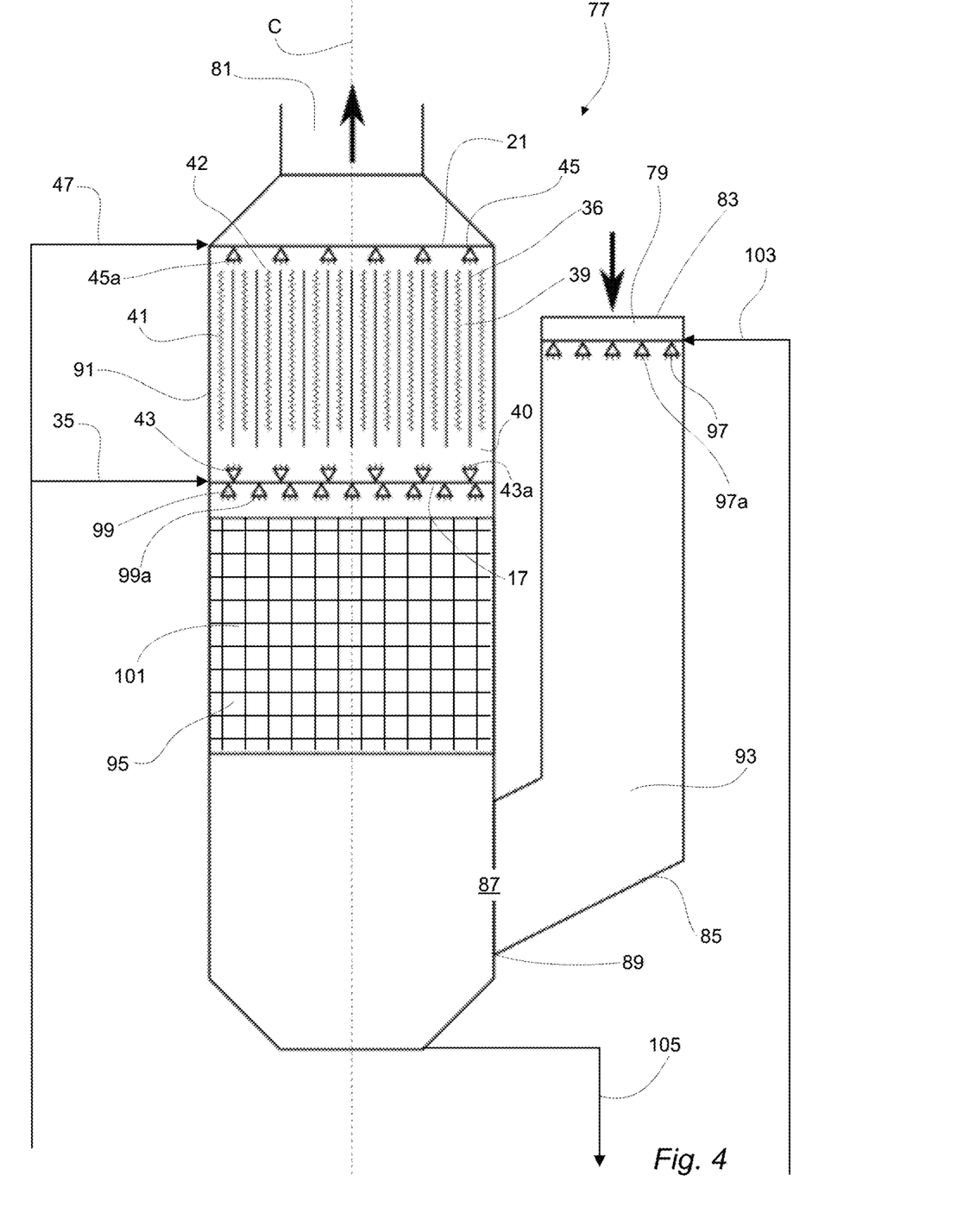

The above described exhaust gas cleaning systems 1 and 49 both comprise scrubbers of inline type, i.e. scrubbers where the first and second scrubbing sections are aligned. In the exhaust gas cleaning systems 1 and 49 the exhaust gas flow direction through the wet Electrostatic Precipitator and the scrubbing section is vertical and upwards. Naturally, the present invention is equally applicable in exhaust gas cleaning systems comprising scrubbers of other types, such as U-type scrubbers. FIG. 4 illustrates such an exhaust gas cleaning system 77. In the exhaust gas cleaning system 77 the exhaust gas flow direction is first vertical and downwards before being redirected so as to become vertical and upwards. Thus, through the wet Electrostatic Precipitator and most of the scrubbing section of the exhaust gas cleaning system 77 the exhaust gas flow direction is vertical. The exhaust gas cleaning systems 1 and 77 (FIGS. 2 and 4) are very similar and differ only in a few further points. Hereinafter, the further differences between the exhaust gas cleaning systems 1 and 77 will be focused on.

The exhaust gas to be cleaned is fed to the exhaust gas cleaning system 77 through an exhaust gas inlet 79 thereof. The cleaned exhaust gas is fed from the exhaust gas cleaning system 77 through an exhaust gas outlet 81 thereof, into the atmosphere via a chimney not illustrated. The exhaust gas cleaning system 77 comprises a wet scrubber 83, in turn comprising a housing 85 defining a scrubber chamber 87 inside which the exhaust gas is cleaned. The housing 85, and thus the scrubber chamber 87, is essentially U-shaped. The exhaust gas system 77 comprises a scrubbing section 89 and a wESP section 91 arranged in succession inside the scrubber 83. In turn, the scrubbing section 89 comprises a first sub scrubbing section, more particularly a so-called jet section, 93, and a second sub scrubbing section, more particularly a so-called filling section, 95, the filling section 95 being arranged between the jet section 93 and the wESP section 91. Further, since the scrubber chamber 87 is essentially U-shaped, the jet section 93 and the filling section 95 are arranged beside each other.

The jet section 93 comprises a third number of second ejection devices or nozzles 97 arranged along a bridge in a top portion of the jet section 93 and downwards directed. When the exhaust gas cleaning system 77 is in operation and exhaust gas is fed through the scrubber 83, the nozzles 97 continuously spray scrubbing fluid, in the form of seawater, to clean the exhaust gas. The filling section 95 comprises a fourth number of third ejection devices or nozzles 99 arranged along a bridge and a filling 101. The nozzles 99 are arranged in a top portion of the filling section 95 and downwards directed. When the exhaust gas cleaning system 77 is in operation and exhaust gas is fed through the scrubber 83, the nozzles 99 continuously spray scrubbing fluid, in the form of seawater, to further clean the exhaust gas.

As indicated by the arrows 103 and 35 in FIG. 4, the scrubbing fluid, i.e. the seawater, is fed directly from the ships sea chest to the nozzles 97 and the nozzles 99. After having passed one of the sub scrubbing sections 93 and 95 once, depending on if fed from the nozzles 97 or the nozzles 99, the seawater is discharged from the scrubber 83, as indicated by the arrow 105, back to the sea, possibly after cleaning.

The wESP sections 13 of the exhaust gas cleaning systems 1 and 77 have similar designs and functions. The downward flowing cleaning fluids from the wESP section 13 of the exhaust gas cleaning system 77 pass the filling section 95 before being discharged at the arrow 105.

Figure 5:
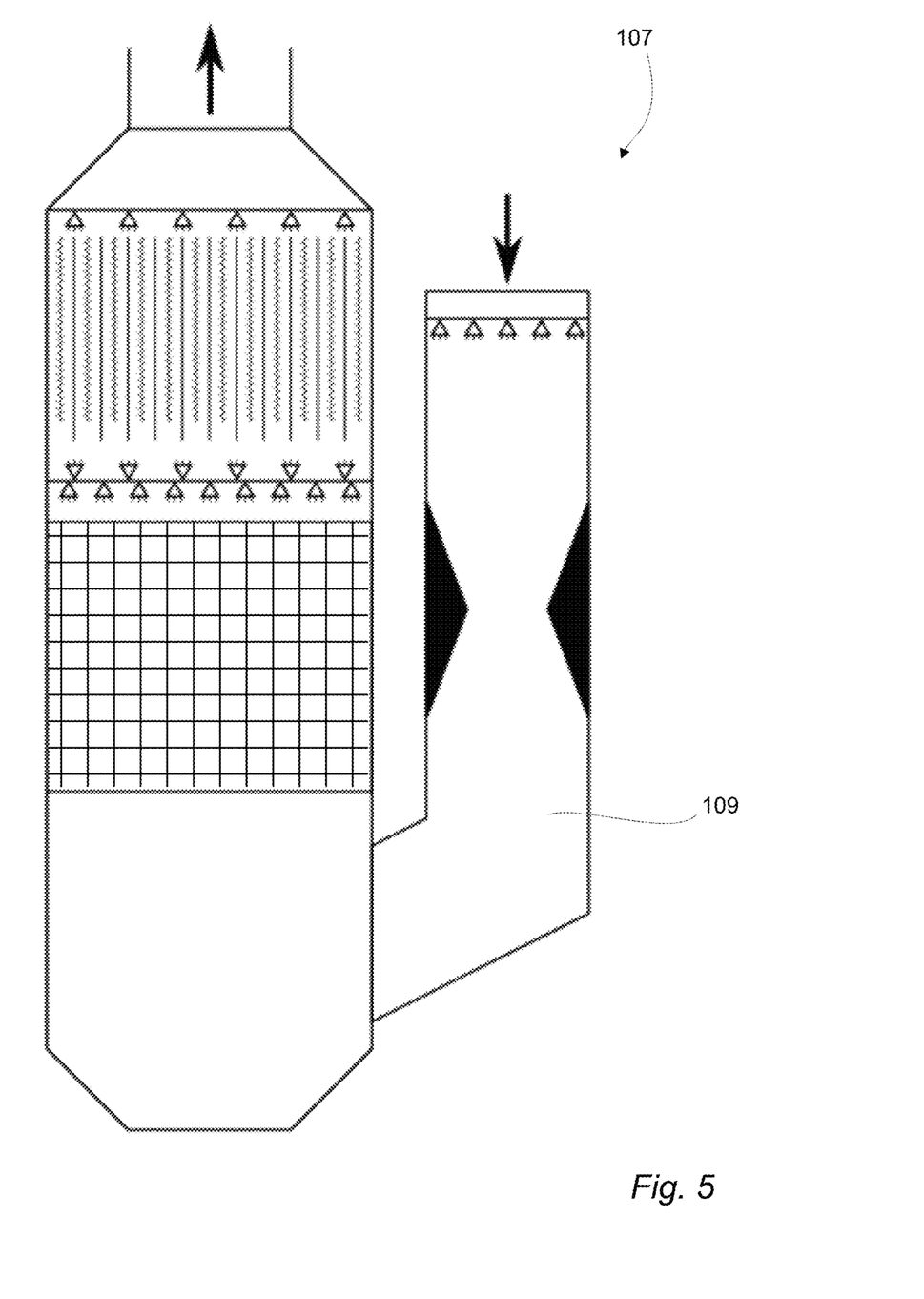

FIG. 5 illustrates another exhaust gas cleaning system 107 according to the present invention. The exhaust gas cleaning systems 77 and 107 have similar designs with one exception. The exhaust gas system 107 comprises a jet section 109 of venturi-type, i.e. a jet section with a locally decreased cross section at a center portion of the jet section, which is not the case for the jet section 93 of the exhaust gas cleaning system 77. The design and purpose of venturi-type scrubbing section is well-known and will not be described herein.

The components of the above described exhaust gas cleaning systems are connected by suitable piping to allow them to communicate in the above specified way. Further, the exhaust gas systems described above may comprise additional components to make them work properly, such as pumps, valves, sensors, cleaning equipment, water analysis units, control units etc.

The first, second, third and fourth ejection devices could be of similar or different types. The first, second, third, fourth and fifth numbers referred to above may be the same or different.

The above described embodiments of the present invention should only be seen as examples. A person skilled in the art realizes that the embodiments discussed can be varied in a number of ways without deviating from the inventive conception.

As an example, the exhaust gas cleaning system according to FIG. 1 could comprise a scrubber of closed loop type and possibly a circulations tank (which could also be omitted) and/or be operated with a mixture of fresh water or seawater and an alkaline agent as a scrubbing fluid and/or a cleaning fluid. Further, the exhaust gas cleaning system according to FIG. 3 could comprise a scrubber of open loop type and/or be operated with seawater as a scrubbing fluid and/or a cleaning fluid.

The scrubbing fluid and the cleaning fluid need not be of the same type but could be of different types which could demand that the scrubber fluid is kept separated from the cleaning fluid at all times and, accordingly, that the cleaning fluid is drained from the exhaust gas cleaning system separate from the scrubbing fluid, and not drained through the scrubbing section as described above.

The scrubbing section of the above described embodiments of the invention comprises a jet section and a filling section which makes the associated scrubber a so-called packed bed scrubber. However, alternative scrubbing sections are possible. As an example, the filling section could be omitted and replaced or not by another jet section, which would make the associated scrubber a so-called sprayer based scrubber. As another example, the filling section could be replaced by a section comprising trays.

It should be stressed that the attributes first, second, third, etc. is used herein just for distinguishing purposes and not to express any kind of specific order. It should be stressed that a description of details not relevant to the present invention has been omitted and that the figures are just schematic, simplified and not drawn according to scale.

LIST OF REFERENCE NUMERALS

1 Exhaust gas cleaning system
2 Housing

3 Engine
4 Scrubber chamber
5 Exhaust gas inlet of exhaust gas cleaning system
7 Exhaust gas outlet of exhaust gas cleaning system
9 Scrubber
11 Scrubbing section
13 wESP section
15 Exhaust gas outlet of scrubbing section
17 Exhaust gas inlet of wESP section
19 Exhaust gas inlet of scrubbing section
21 Exhaust gas outlet of wESP section
23 First sub scrubbing section, jet section
25 Second sub scrubbing section, filling section
27 Second ejection devices, nozzles
27a Ejection orifices
29 Third ejection devices, nozzles
29a Ejection orifices
31 Filling
33 Arrow
35 Arrow
36 Wall
37 Arrow
38 Channel
39 wet Electrostatic Precipitator
40 Exhaust gas inlet of wet Electrostatic Precipitator
41 Tubes
42 Exhaust gas outlet of wet Electrostatic Precipitator
43 First ejection devices, nozzles
43a Ejection orifices
45 Fourth ejection devices, nozzles
45a Ejection orifices
47 Arrow
49 Exhaust gas cleaning system
51 Scrubber
53 Scrubbing section
55 wESP section
57 Exhaust gas outlet of scrubbing section
59 Exhaust gas outlet of scrubber
61 Exhaust gas inlet of wESP section
63 Arrow
65 Arrow
67 Circulation tank
69 Arrow
71 Arrow
73 Piping
75 Arrow
77 Exhaust gas cleaning system
79 Exhaust gas inlet of exhaust gas cleaning system
81 Exhaust gas outlet of exhaust gas cleaning system
83 Scrubber
85 Housing
87 Scrubber chamber
89 Scrubbing section
91 wESP section
93 First sub scrubbing section, jet section
95 Second sub scrubbing section, filling section
97 Second ejection devices, nozzles
97a Ejection orifices
99 Third ejection devices, nozzles
99a Ejection orifices
101 Filling
103 Arrow
105 Arrow
107 Exhaust gas cleaning system
109 First sub scrubbing section, jet section
C Longitudinal center axis of second scrubbing section and the wESP section

The invention claimed is:

1. An exhaust gas cleaning system for cleaning exhaust gas onboard a ship as the exhaust gas flows in an exhaust gas flow direction through the exhaust gas cleaning system, the exhaust gas cleaning system comprising:
an exhaust gas inlet for receiving the exhaust gas to be cleaned,
a scrubber arranged to clean, in a scrubbing section of the scrubber, the exhaust gas from pollutants, wherein the scrubbing section comprises an exhaust gas inlet for receiving the exhaust gas and an exhaust gas outlet for outputting the exhaust gas,
the scrubbing section comprising a first sub scrubbing section and a number≥1 of first sub scrubbing section ejection devices arranged inside the first sub scrubbing section to eject a scrubbing fluid into the exhaust gas in the first sub scrubbing section to wash the exhaust gas that has entered the exhaust gas inlet,
the scrubbing section comprising a second sub scrubbing section and a number≥1 of second sub scrubbing section ejection devices arranged inside the second sub scrubbing section, the second sub scrubbing section ejection devices being arranged to supply scrubbing fluid to wash the exhaust gas in the second sub scrubbing section,
a wet Electrostatic Precipitator arranged to further clean the exhaust gas from pollutants after it has been cleaned in the scrubbing section, wherein the wet Electrostatic Precipitator comprises an exhaust gas inlet arranged in communication with the exhaust gas outlet of the scrubbing section for receiving the exhaust gas, an exhaust gas outlet for outputting the exhaust gas, and at least one channel arranged to convey the exhaust gas from the exhaust gas inlet to the exhaust gas outlet of the wet Electrostatic Precipitator, the at least one channel being an elongated channel that is elongated in the exhaust gas flow direction extending from the exhaust gas inlet of the wet Electrostatic Precipitator to the exhaust gas outlet of the wet Electrostatic Precipitator so that the exhaust gas entering the wet Electrostatic Precipitator at the gas inlet of the wet Electrostatic Precipitator flows in the exhaust gas flow direction along the at least one channel toward the gas outlet of the wet Electrostatic Precipitator,
the second sub scrubbing section being arranged between the wet Electrostatic Precipitator and the first sub scrubbing section in the exhaust gas flow direction,
an exhaust gas outlet for outputting the cleaned exhaust gas, and
a number≥1 of wet Electrostatic Precipitator ejection devices arranged between the scrubbing section and said at least one channel, each of the wet Electrostatic Precipitator ejection devices comprising an ejection orifice facing the wet Electrostatic Precipitator and being arranged to, when exhaust gas is flowing through the exhaust gas cleaning system, eject liquid in the exhaust gas flow direction towards said at least one channel so that the liquid ejected by the wet Electrostatic Precipitator ejection devices enters said at least one channel to clean said at least one channel from pollutants deposited by the exhaust gas when the exhaust gas is conveyed through said at least one channel.

2. The exhaust gas cleaning system according claim 1, wherein the exhaust gas cleaning system lacks a demister between the exhaust gas outlet of the wet Electrostatic Precipitator and the exhaust gas outlet of the exhaust gas cleaning system.

3. The exhaust gas cleaning system according to claim 1, wherein the scrubber comprises an exhaust gas outlet for outputting the exhaust gas, the exhaust gas outlet being arranged in communication with the exhaust gas outlet of the scrubbing section for forwarding the exhaust gas, and wherein the exhaust gas inlet of the wet Electrostatic Precipitator is arranged in communication with the exhaust gas outlet of the scrubber for receiving the exhaust gas.

4. The exhaust gas cleaning system according to claim 1, wherein the second sub scrubbing section comprises a filling arranged inside the second sub scrubbing section.

5. The exhaust gas cleaning system according to claim 1, wherein the second sub scrubbing section and a wet Electrostatic Precipitator section of the exhaust gas cleaning system comprising the wet Electrostatic Precipitator have essentially similar outer contours along a longitudinal center axis of the second scrubbing section and the wet Electrostatic Precipitator section.

6. The exhaust gas cleaning system according to claim 1, wherein the scrubbing fluid has a pH value above 7.

7. The exhaust gas cleaning system according to claim 1, further comprising a fifth number≥1 of channel ejection devices arranged between the exhaust gas outlet of the exhaust gas cleaning system and said at least one channel and arranged to, when no exhaust gas is flowing through the exhaust gas cleaning system, eject liquid towards said at least one channel to clean it from pollutants deposited by the exhaust gas when this is conveyed through said at least one channel.

8. The exhaust gas cleaning system according to claim 1, wherein the exhaust gas flow direction through the wet Electrostatic Precipitator and at least most of the scrubbing section is essentially vertical.

9. A method for cleaning exhaust gas onboard a ship, comprising
feeding the exhaust gas from an engine installed onboard the ship to a scrubber onboard the ship;
cleaning the exhaust gas from pollutants in a scrubbing section of the scrubber conveying the exhaust gas in an exhaust gas flow direction through a first sub scrubbing section of the scrubbing section and through a second sub scrubbing section of the scrubbing section,
the cleaning of the exhaust gas from the pollutants in the scrubbing section comprising ejecting a scrubbing fluid inside the first sub scrubbing section to wash the exhaust gas that is in the first sub scrubbing section,
the cleaning of the exhaust gas from the pollutants in the scrubbing section also comprising supplying scrubbing fluid to the second sub scrubbing section of the scrubbing section to wash the exhaust gas that is in the second sub scrubbing section,
further cleaning the exhaust gas from pollutants in a wet Electrostatic Precipitator onboard the ship after the exhaust gas has been cleaned in the first sub scrubbing section and the second sub scrubbing section of the scrubbing section, the wet Electrostatic Precipitator comprising at least one channel arranged to convey the exhaust gas through the wet Electrostatic Precipitator, the second sub scrubbing section being arranged between the wet Electrostatic Precipitator and the first sub scrubbing section in the exhaust gas flow direction, and
ejecting, when exhaust gas is flowing through the wet Electrostatic Precipitator, liquid through a respective ejection orifice of a number≥1 of wet Electrostatic Precipitator ejection devices arranged between the scrubbing section and said at least one channel, the wet Electrostatic Precipitator ejection orifices facing the wet Electrostatic Precipitator, towards said at least one channel to clean it from pollutants deposited by the exhaust gas when this is conveyed through said at least one channel.

10. The method according to claim 9, comprising releasing the exhaust gas into the atmosphere, after said cleaning and further cleaning from pollutants, without passing it through a demister.

11. The method according to claim 9, wherein the wet Electrostatic Precipitator is arranged outside the scrubber such that said cleaning of the exhaust gas from pollutants takes place inside the scrubber while said further cleaning of the exhaust gas from pollutants takes place outside the scrubber.

12. The method according to claim 9, wherein the supplying of the scrubbing fluid to the second sub scrubbing section of the scrubbing section also comprises supplying the scrubbing fluid to a filling arranged inside the second sub scrubbing section of the scrubbing section to wash the exhaust gas when the exhaust gas passes through the filling.

13. The method according to claim 9, wherein the scrubbing fluid has a pH value above 7.

14. The method according to claim 9, comprising feeding the exhaust gas through the wet Electrostatic Precipitator and at least most of the scrubbing section in an essentially vertical exhaust gas flow direction.

15. The method according to claim 9, wherein the ejecting of the liquid through the respective ejection orifice of the wet Electrostatic Precipitator ejection devices comprises ejecting seawater through the respective ejection orifice of the wet Electrostatic Precipitator ejection devices.

16. The method according to claim 9, wherein the ejecting of the scrubbing fluid inside the first sub scrubbing section and the second sub scrubbing section comprises ejecting seawater through plural injection nozzles into the first sub scrubbing section and the second sub scrubbing section, the injection nozzles including two sets of injection nozzles that are spaced apart from one another in the exhaust gas flow direction.

17. A ship that includes a marine combustion engine, a burner or a boiler that produces exhaust gas, the ship comprising an on-board exhaust gas cleaning system to reduce pollutants in the exhaust gas as the exhaust gas flows in an exhaust gas flow direction through the on-board exhaust gas cleaning system, the exhaust gas cleaning system comprising:
an exhaust gas inlet for receiving the exhaust gas to be cleaned;
a scrubber arranged to clean, in a scrubbing section of the scrubber, the exhaust gas and remove pollutants from the exhaust gas, the scrubbing section comprising an exhaust gas inlet for receiving the exhaust gas and an exhaust gas outlet for outputting the exhaust gas that has been cleaned by the scrubber;
the scrubbing section comprising a first sub scrubbing section and a number≥1 of first sub scrubbing section ejection devices arranged inside the first sub scrubbing section to eject a scrubbing fluid into the exhaust gas in the first sub scrubbing section to wash the exhaust gas that has entered the exhaust gas inlet,
the scrubbing section comprising a second sub scrubbing section and a number≥1 of second sub scrubbing section ejection devices arranged inside the second sub scrubbing section, the second sub scrubbing section ejection devices being arranged to supply scrubbing fluid to wash the exhaust gas in the second sub scrubbing section, a wet Electrostatic Precipitator arranged to further clean the exhaust gas from pollutants after it has been cleaned in the scrubbing section, wherein the wet Electrostatic Precipitator comprises an exhaust gas inlet arranged in communication with the exhaust gas outlet of the scrubbing section for receiving the exhaust gas, an exhaust gas outlet for outputting the exhaust gas, and at least one channel arranged to convey the exhaust gas from the exhaust gas inlet to the exhaust gas outlet of the wet Electrostatic Precipitator, the second sub scrubbing section being arranged between the wet Electrostatic Precipitator and the first sub scrubbing section in the exhaust gas flow direction, an exhaust gas outlet for outputting the cleaned exhaust gas; and a number≥1 of wet Electrostatic Precipitator ejection devices arranged between the scrubbing section and the at least one channel, each of the wet Electrostatic Precipitator ejection devices comprising an ejection orifice facing the wet Electrostatic Precipitator and being arranged to, when exhaust gas is flowing through the exhaust gas cleaning system, eject liquid towards the at least one channel to clean it from pollutants deposited by the exhaust gas when this is conveyed through the at least one channel.

18. The ship according to claim 17, wherein each of the wet Electrostatic Precipitator ejection devices is connected to a source of seawater constituting the liquid that is ejected towards the at least one channel.

* * * * *